Figure 2:
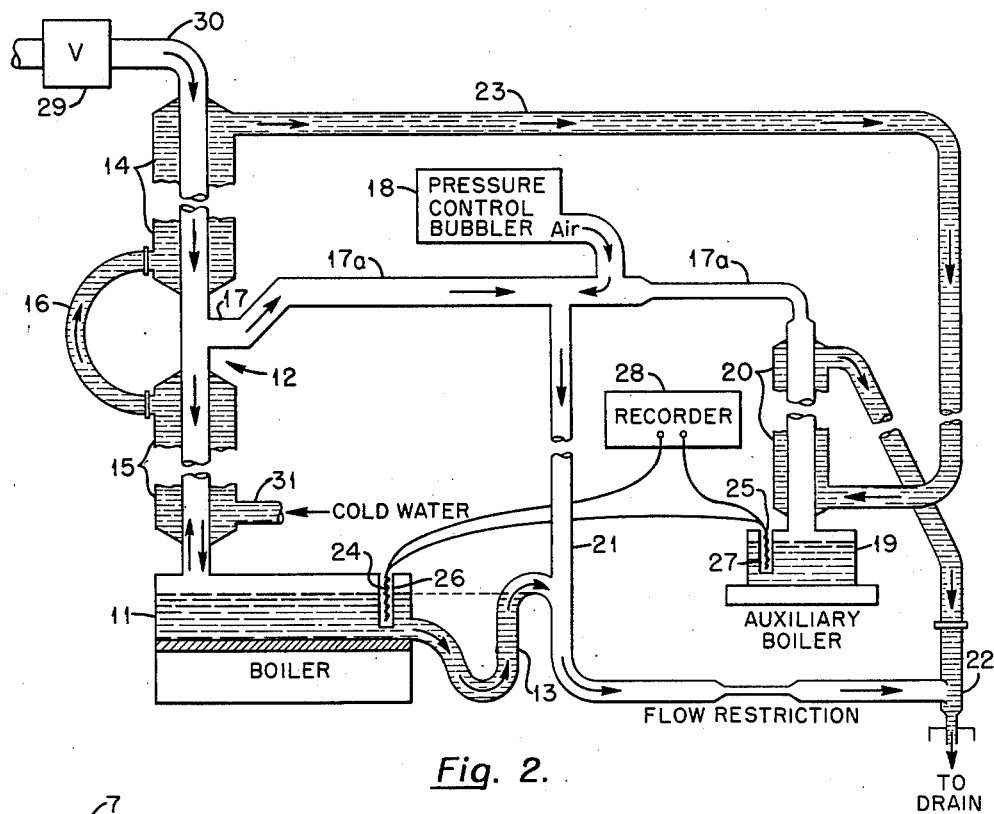

March 19, 1963 W. S. PAPPAS 3,081,619
CONTINUOUS ANALYZER UTILIZING BOILING POINT DETERMINATION
Filed Jan. 16, 1961

INVENTOR.
William S. Pappas
BY
ATTORNEY

2

3,081,619
CONTINUOUS ANALYZER UTILIZING BOILING POINT DETERMINATION
William S. Pappas, Oak Ridge, Tenn., assignor to the United States of America as represented by the United States Atomic Energy Commission
Filed Jan. 16, 1961, Ser. No. 83,126
8 Claims. (Cl. 73—17)

This invention relates generally to an improved apparatus for continuously determining the boiling point of liquid mixtures. More particularly it relates to an apparatus for continuously determining the concentration of hydrogen fluoride in water by continuously determining the initial boiling point of a sample drawn from a flowing stream.

It has long been known that the composition of a mixture of liquids can be determined by determining the boiling point of the mixture. Thus, the composition of a mixture of liquid hydrocarbons flowing in refinery process stream is monitored by periodically or continuously determining the initial boiling points of samples withdrawn from the stream. In addition, the composition of binary mixtures such as $HCl-H_2O$, $HF-H_2O$, and $H_2O$ and the various alcohols may be similarly determined.

In the past, instruments for automatically and continuously sampling a process stream and determining its boiling point have been available. These instruments generally comprise a distillation chamber provided with a water-cooled reflux condenser and a sample inlet and outlet, usually in the form of concentrically-disposed conduits defining an annular space through which sample introduction is effected. The sample outlet is the inner conduit which usually takes the form of a standpipe located within the distillation chamber.

These prior instruments have had several defects which have seriously detracted from their utility. Firstly and most importantly, these instruments have been severely limited in their applicability to liquid mixtures: the boiling points of some mixtures cannot be determined by the instruments. The vapor phase in equilibrium with certain liquids containing a high concentration of a highly volatile component such as HF have condensation temperatures which are too low for water-cooled condensers. For example, in the $H_2O-HF$ system, a solution containing 70 weight percent HF boils at approximately 63° C. However, the vapor phase above it contains 97 weight percent HF and is not fully condensed until the temperature is below 22° C. Water-cooled condensers usually cannot provide a temperature this low without refrigeration. If the above-described instruments of the prior art are used to determine the boiling point of an aqueous solution containing 70 weight percent HF, an erroneous reading will result because the water-cooled reflux condenser would be unable to provide a total reflux. HF would be distilled causing the HF concentration in the sample to fall and the resultant observation of a high boiling point. Generally, instruments provided with water-cooled condensers cannot be used on $HF-H_2O$ solutions containing more than 60 weight percent HF. The same problem exists with hydrocarbon mixtures containing highly volatile components. Mixtures having boiling points below approximately 200° F. usually cannot be successfully analyzed by water-cooled boiling-point instruments which have been available heretofore.

It is, therefore, a major object of the invention to provide an improved boiling point apparatus which is operable over a wider temperature range than previous instruments of its type.

A second major defect of prior instruments is their susceptibility to erroneous readings caused by overheating. If the heat input to the boiler is high enough to cause the condenser walls to increase in temperature, the fractionation discussed above will occur at lower sample concentrations and cause erroneous readings.

Accordingly, it is a further object of the present invention to provide an instrument which is less sensitive to overheating.

Thirdly, prior instruments have been susceptible to erroneous readings caused by undesirable sample flow through their distillation chambers. When concentric inlet-outlet conduits are used, the flow tends to "short-circuit" from the inlet to the outlet and does not mix properly with the boiling sample.

Accordingly, it is a further object to provide an instrument having an improved sample flow pattern through its distillation chamber.

Many process streams are composed of mixtures of vapors, some of which are condensable, the others being non-condensable. Frequently it is desired to continuously determine the composition of the condensable portion of the stream by continuously monitoring the boiling point of that portion. However, continuous analyzers presently in use are incapable of sampling such a stream.

It is, accordingly, a further object of the invention to provide such an instrument.

It is well known that the boiling point of a solution varies with pressure. Since atmospheric pressure conditions change continuously, errors in boiling point determination will result unless pressure is taken into account.

Accordingly, it is a still further object of the invention to provide a boiling-point instrument having pressure-compensation means as an integral component thereof.

Figure 1:
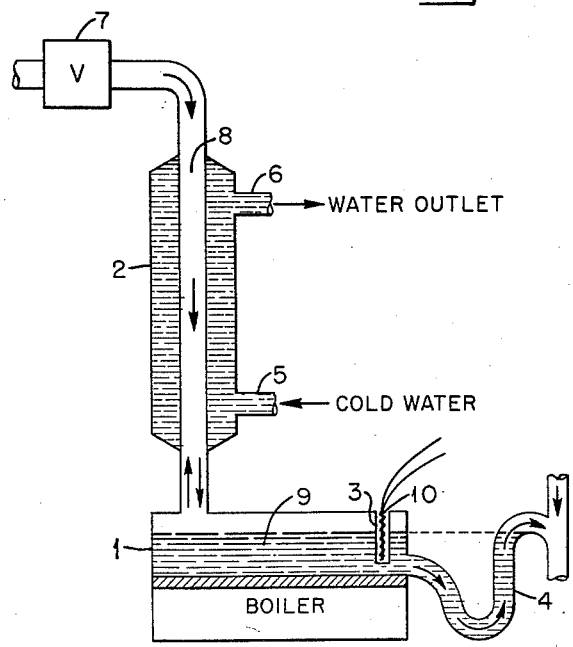

Other objects of the invention will become apparent from an examination of the following written description of an embodiment of the invention and the drawings appended thereto, wherein:

FIG. 1 is a diagrammatic representation of an instrument utilizing the basic principles of the present invention; and, FIG. 2 is a diagrammatic representation of a more elaborate embodiment.

In accordance with the present invention, a boiling-point instrument having very superior attributes is provided by changing the flow through the instrument in such a manner that the incoming sample contacts the condensing vapors in the reflux condenser before reaching the distillation chamber itself. The absorption of refluxing vapors which occurs by such an introduction of the incoming sample eliminates the loss of vapor which characterized prior water-cooled instruments of this type, and greatly increases their usefulness. For example, instruments constructed according to the present invention are capable of determining the boiling points of $HF-H_2O$ solutions up to 90 weight percent HF, whereas instruments of the prior art could be used only at HF concentrations lower than 60 weight percent HF.

Even in the range where prior instruments were operable, instruments which incorporate the present invention provide superior results. Refluxing vapors in the condensers of instruments not incorporating the present invention are subject to fractionation with the consequent distillation and loss of light components. This fractionation effect can be compensated for in calibration, but to avoid error, operation subsequent to calibration must be conducted under exactly the same conditions which existed during calibration. Thus, operating conditions of prior instruments have had to be carefully controlled to avoid erroneous readings. For example, a heat input greater or less than the calibration input could induce a material error because of an increase or decrease in the fractionation effect. In apparatus incorporating the present invention, the fractionation effect is eliminated by absorption. Thus, critical control of operating conditions is not necessary.

Referring to FIG. 1, which is a cross-sectional view of one embodiment of the bisic invention, a distillation chamber 1, heated by any suitable means, is provided with a reflux condenser 2, a thermocouple well 3, and a U-tube sample outlet 4. Reflux condenser 2 is provided with a coolant water inlet and outlet 5 and 6, respectively. In operation, an incoming liquid sample is continuously introduced to the apparatus by any suitable means through flow control valve 7 into the upper extremity 8 of reflux condenser 2. In reflux condenser 2 the incoming liquid sample contacts and absorbs the refluxing vapors and flows into distillation chamber 1 where it mixes with boiling, previously-collected sample 9. U-tube 4 affords the sample outlet for the instrument and provides for a constant liquid level in distillation chamber 1. A thermocouple 10, or any other suitable temperature-sensing means, continuously monitors the boiling point of liquid sample 9, which is the same as the boiling point of the incoming sample at valve 7 assuming zero response time. As an alternative, the sample outlet may suitably take the form of a standpipe which penetrates the bottom of distillation chamber 1 and rises to the liquid level desired.

The above-described apparatus and other embodiments which will be described below are advantageous over prior instruments in that a sample introduction and withdrawal occur at widely separated points.

The embodiment of FIG. 1 illustrates the invention in its most simple form. A more elaborate embodiment including pressure compensation and automatic, differential-temperature determination is illustrated in FIG. 2. Referring to that figure, a distillation chamber or boiler 11, heated by any suitable means, is provided with a split condenser 12 and a U-tube sample outlet 13 adapted to maintain a constant liquid level in the boiler. Split condenser 12 comprises an upper sample condenser 14 and a lower reflux condenser 15 linked by a coolant by-pass 16, and is provided with a central tap 17. Central tap 17 communicates by means of conduit 17a with any suitable known pressure control device illustrated schematically at 18, and the interior of a solvent distillation chamber 19 which is provided with a reflux condenser 20. Conduit 21 connects conduit 17a to the vacuum side of an aspirator 22. Aspirator 22 utilizes outlet coolant water from condensers 20 and 12, which are linked in series by means of conduit 23. Thermocouples 24 and 25, which occupy thermocouple wells 26 and 27 in boilers 11 and 19, respectively, are connected to a recorder 28, adapted to derive and display the temperature difference between the two boilers.

In operation, an incoming sample of liquid and/or condensable vapor, such as water and HF vapor, which may contain, in addition, non-condensable gases, such as $N_2$, is admitted to upper portion 14 of condenser 12, and flows into the lower reflux portion 15, where it contacts and absorbs condensing vapors therein. Cold water circulates from inlet 31 through lower portion 15, by-pass 16, and upper portion 14 condenser 12 to conduit 23 which circulates the water to reflux condenser 20 and aspirator 22. Non-condensable gases emanating from upper portion 14 of condenser 12 are withdrawn through central tap 17 and conduits 17a and 21 by aspirator 22. Solvent boiler 19 contains a standard solution or pure solvent, the boiling point of which is compared to the boiling point of the sample, by means of thermocouples 24 and 25, and recorder 28.

It will be noted that the apparatus of FIG. 2 utilizes the vapor absorption principle of the apparatus of FIG. 1, and in addition, has the ability to sample vapor streams containing non-condensable gases. Moreover, the apparatus is fully pressure compensated.

Since many deviations from and modifications of the embodiments described above may be made without departing from the scope of the invention, the invention should be limited only by the claims appended hereto.

Having thus described this invention, what is claimed is:

1. An apparatus for continuously determining the boiling point of a liquid mixture comprising, in combination, a distillation chamber including heating means for boiling the contents thereof, outlet conduit means adapted to maintain the liquid contents of said distillation chamber at a constant level, a reflux condenser mounted above and communicating with said distillation chamber for condensing vapors emanating therefrom, means for continuously introducing an incoming sample into said reflux condenser and into intimate contact with the vapors refluxing within said reflux condenser, and temperature sensing means for continuously determining the boiling point of the liquid flowing through said boiler.

2. Apparatus as claimed in claim 1 wherein the outlet conduit means is a U-tube located externally to said distillation chamber and communicating therewith at a point removed from the location of said condenser.

3. An apparatus for continuously determining the boiling point of a liquid mixture comprising, in combination, a distillation chamber including heating means for boiling the contents thereof, outlet conduit means adapted to maintain the liquid contents of said distillation chamber at a constant level, a reflux condenser mounted above and communicating with said distillation chamber for condensing vapors emanating therefrom, means for continuously introducing an incoming sample into said refluxing condenser and into intimate contact with the refluxing vapors within said reflux condenser, means communicating with said distillation chamber for maintaining a constant pressure over the liquid flowing through said distillation chamber, and temperature sensing means for continuously determining the boiling point of the liquid flowing through said distillation chamber.

4. An apparatus for continuously determining the boiling point of a liquid mixture comprising, in combination, a distillation chamber including heating means for boiling the contents thereof, outlet conduit means adapted to maintain the liquid contents of said distillation chamber at a constant level, a first reflux condenser mounted above and communicating with said distillation chamber for condensing vapors emanating therefrom, a second condenser mounted above and communicating with the interior of said first condenser, said second condenser being adapted to receive and condense a sample comprising a vaporous mixture and introduce the condensed vapors into intimate contact with the refluxing vapors in said first condenser, non-condensable gas outlet conduit means located between said first and second condensers and communicating with the interiors of said said first and second condensers to withdraw non-condensable gases emanating from the bottom of said second condenser, and temperature-sensing means for continuously determining the boiling point of the liquid flowing through said boiler.

5. Apparatus as claimed in claim 4 wherein the outlet conduit means is a U-tube located externally to said distillation chamber and communicating therewith at a point removed from the location of said first condenser.

6. An apparatus for continuously determining the boiling point of a liquid mixture comprising, in combination, a distillation chamber including heating means for boiling the contents thereof, outlet condut means adapted to maintain the liquid contents of said distillation chamber at a constant level, a first reflux condenser mounted above and communicating with said distillation chamber for condensing vapors emanating therefrom, a second condenser mounted above and communicating with the interior of said first condenser, said second condenser being adapted to receive and condense a sample comprising a vaporous mixture and introduce the condensed vapors into intimate contact with the refluxing vapors in said first condenser, noncondensable gas outlet means located between said first and second condensers and communicating with the interior thereof to withdraw non-condensable gases emanating from the bottom of said second condenser, means communicating with the interior of said distillation chamber through said non-condensable gas outlet means for maintaining a constant pressure over the liquid flowing through said distillation chamber, and temperature-sensing means for determining the boiling point of the liquid flowing through said distillation chamber.

7. An apparatus for continuously determining the boiling point of a liquid mixture comprising, in combination, a first distillation chamber including heating means for boiling the contents thereof, outlet conduit means adapted to maintain the liquid content of said first distillation chamber at a constant level, a first condenser mounted above and communicating with said distillation chamber for condensing vapors emanating therefrom, a second condenser mounted above and communicating with the interior of said first condenser, said second condenser being adapted to receive and condense a sample vaporous mixture and introduce the condensed vapors into intimate contact with the refluxing vapors in said first condenser, non-condensable gas outlet means located between said first and second condensers and communicating with the interiors thereof, a second distillation chamber including heating means for boiling a standard liquid contained therein, a third reflux condenser mounted above said second distillation chamber and communicating with the interior thereof for condensing the vapors emanating therefrom, means communicating with and adapted to maintain the same pressure in the interiors of both of said distillation chambers, and temperature-sensing means for deriving the differential boiling temperature between the liquids in said distillation chambers.

8. Apparatus as claimed in claim 7 wherein the outlet conduit means is a U-tube located externally to said distillation chamber and communicating therewith at a point removed from the location of said first condenser.

References Cited in the file of this patent

UNITED STATES PATENTS 2,900,816   Anderson _____ Aug. 25, 1959

OTHER REFERENCES

Ebulliometric Measurements, by W. Swietoslawski, page 14, 1945 (copy in Div. 36, 73–17).